Oct. 19, 1965 D. A. KOHL 3,212,291
STABILIZING SYSTEM FOR DIGITAL SERVO SYSTEMS
Filed Oct. 2, 1961 2 Sheets-Sheet 1
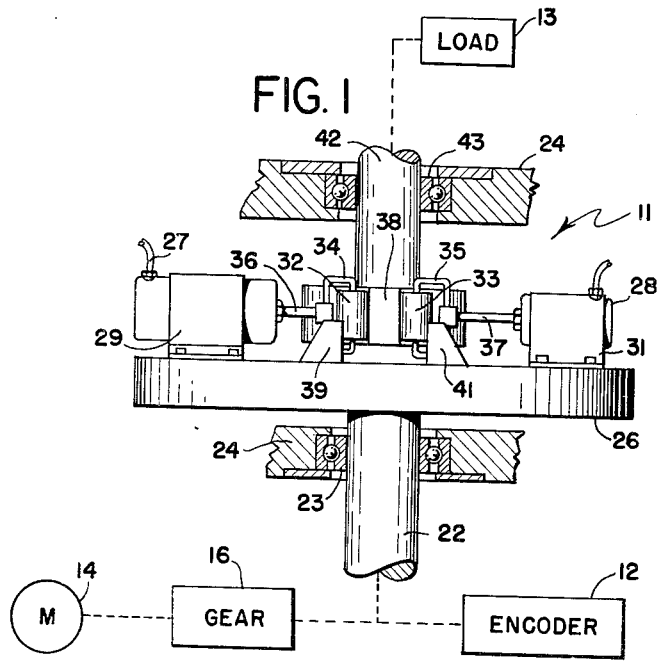
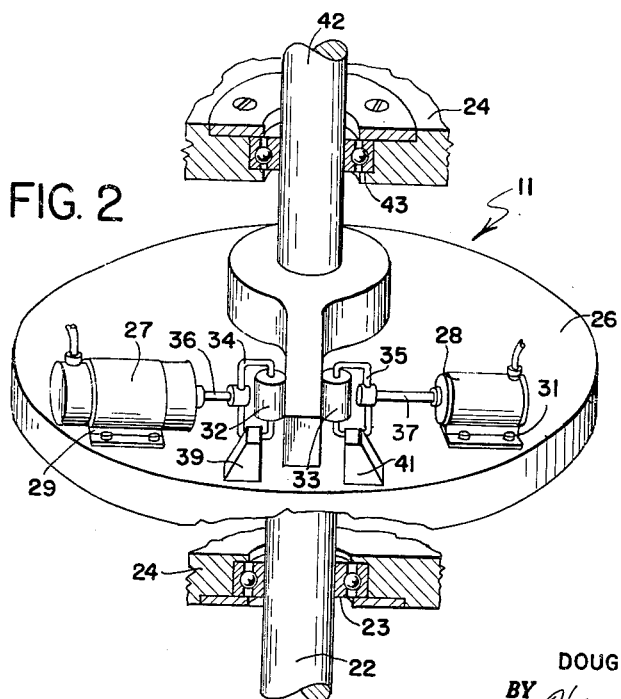
INVENTOR.
DOUGLAS A. KOHL
BY Harold D. Jastram
ATTORNEY Oct. 19, 1965  D. A. KOHL  3,212,291
STABILIZING SYSTEM FOR DIGITAL SERVO SYSTEMS
Filed Oct. 2, 1961  2 Sheets-Sheet 2
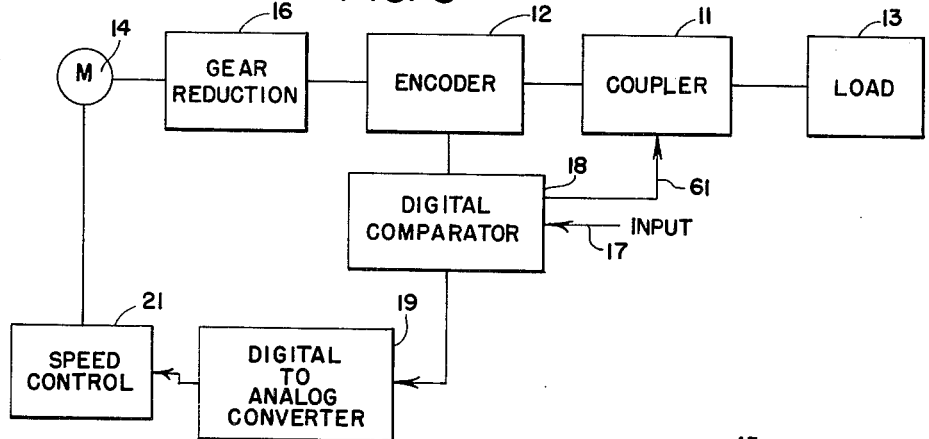
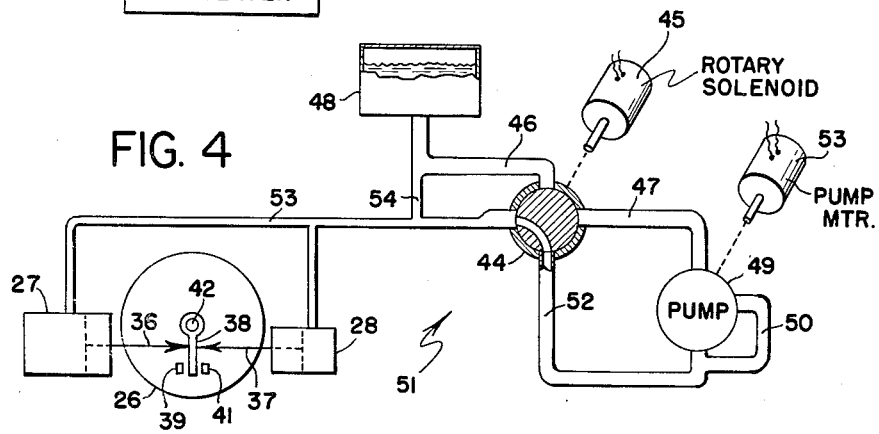
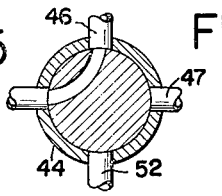
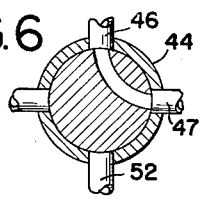
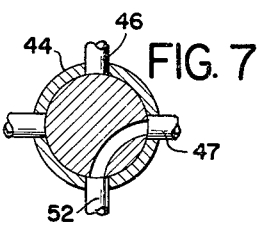
*INVENTOR.*
DOUGLAS A. KOHL
BY *Harold D. Jastram*
ATTORNEY

United States Patent Office 3,212,291
Patented Oct. 19, 1965

3,212,291
STABILIZING SYSTEM FOR DIGITAL
SERVO SYSTEMS
Douglas A. Kohl, Osseo, Minn., assignor, by mesne assignments, to Litton Systems, Inc., Beverly Hills, Calif., a corporation of Maryland
Filed Oct. 2, 1961, Ser. No. 142,323
7 Claims. (Cl. 64—26)

This invention relates to apparatus for stabilizing a servo system, and more particularly to apparatus for stabilizing servo systems by providing a resilient coupling between a servo motor and a load.

Typically, servo systems are plagued by instability due to inertial forces of the system and of a load. Normally a programming signal excites a servo motor so that the motor accelerates to change the static position of a load in accordance with the input signal. The accelerating servo motor must overcome the static inertia of the load in order to reposition the load in the new programmed position. The static inertial forces of the load tend to force the load to lag behind the input or programming signal, consequently increasing the probability of damaging the motor as well as the mechanical mechanisms interconnecting the motor and load. Additionally, as the programming signal is terminated, the servo motor rapidly decelerates and attempts to come to rest, however, the dynamic inertia of the load resists the deceleration of the servo motor and forces the servo system to overrun the final programmed position. When the load overruns the programmed position, the servo senses the error and attempts to reposition the load to the programmed position. This overrunning of the programmed position or "hunting" is undesirable in the servo system since if the load is large, a great deal of time will pass before the system will come to rest, if at all, in a final programmed position.

An object of the invention is to provide a new and improved apparatus for stabilizing a positioning servo system.

Another object of the invention is to provide an apparatus for reducing the effect of mechanical inertial forces in a servo system.

A further object of the invention is to provide an apparatus for coupling a servo motor and a load to reduce the effect of inertial forces when the motor accelerates or decelerates.

A still further object of the invention is to provide an apparatus for yieldably coupling a motor and a load in order to disengage the motor from the load when the motor is accelerating.

Another object of the present invention is to provide a hydraulic system for damping the inertial energy produced by large loads.

Another object of the present invention is to provide an apparatus for finally positioning a load according to a programmed signal without undesirable oscillation of the load about a programmed position.

An apparatus forming a more specific embodiment of the invention may include an arm connected to an output shaft and interposed between a pair of opposed hydraulic pistons. The pistons are rigidly mounted on a disc which is secured to a drive shaft of a servo motor. As the motor accelerates the arm is forced, by static inertial forces developed in the load, against a first of a pair of pistons. When the servo motor is deenergized, the dynamic inertial energy of the load and output shaft are damped by a second of the pair of pistons. A hydraulic system is provided and acts as the damping means for the system. Final positioning of the load takes place when pressure is applied to the system and the larger of the two pistons overcomes the opposed piston forcing the arm against a reference stop.

A complete understanding of the invention may be obtained from the following detailed description of an apparatus forming a specific embodiment, when read in conjunction with the drawings in which;

FIGURE 1 is a front view of a coupling apparatus for interconnecting a servo motor and/or gear train shaft and a load shaft;

FIG. 2 is a perspective view of a coupling apparatus illustrated in FIGURE 1;

FIG. 3 is a block diagram of a typical servo system utilizing a coupler according to FIGURE 1 connected in the system;

FIG. 4 is a schematic of a hydraulic system used in connection with the coupler illustrated in FIGURE 1 and;

FIGS. 5, 6 and 7 are fragmentary views of a rotary valve utilized in the hydraulic system of FIG. 4.

Referring first to FIG. 3 of the drawings there is shown a block diagram of a typical servo system with a coupler 11 inserted between an encoder 12 and the load 13. Motor 14 is a servo motor which drives a gear reduction or gear train 16 when a programming signal is received at the input 17. The output from the gear reduction 16 is sensed or measured by a digital encoder 12. The digital encoder 12 measures the angular position of a drive shaft which is connected to gear reduction 16. The angular position of a drive shaft from gear reduction 16 is then converted by the encoder 12 into a digital signal so that a instantaneous angular position of the drive shaft may be compared with a programmed input signal to control further positioning of the drive shaft interconnecting the encoder 12 and the gear reduction 16 as well as a drive shaft which ultimately positions load 13 in accordance with the predetermined input. Gear reduction 16 could be included as part of the coupler 11 so that the system would include the motor 14, the coupler 11 and load 13.

Encoder 12 may be any one of several well known digital encoders which can accomplish the transfer of angular position of a shaft to digital form. The invention is going to be explained in terms of a binary digital encoding system. However, it should be noted that the invention may also be practiced in a similar analogue system.

The instantaneous position of load 13 which is represented by a digital output signal from encoder 12 is fed into a digital comparator 18. The signal from encoder 12 indicates the present position as noted and this digital information is registered in the digital comparator 18. An external digital input to digital comparator 18 at input 17 represents a new required position for the load 13. The input signal is thus compared in comparator 18 with the signal from encoder 12 and difference or error code in digital form is generated representing the angular difference which may exist between the existing load 13 angle and the input angle. This error code is applied to the digital to analogue converter 19 as a binary digital signal. Converter 19 changes the digital error signal from comparator 18 into a corresponding analogue signal. This analogue signal represents the speed and direction with which the servo motor 14 should run in order to drive the output shaft through the gear reduction 16 toward the required position. As the required output shaft position is approached, the analogue signal will decrease until it becomes zero when the output position exactly matches the input. It should be noted that the comparator 18 and converter 19 may be combined.

The analogue voltage from converter 19 is fed into a speed control 21 which may be a transistorized servo amplifier. The amplifier or speed control 21 amplifies the analogue signal from converter 19 and furnishes a power signal to servo motor 14 so that servo motor 14 is excited to an extent which is proportional to the digital error signal output from comparator 18. Energized motor 14 drives gear reduction 16, encoder 12, coupler 11, and load 13 to a null in accordance with the diminishing output signal from comparator 18.

Normally in such a system as the one just described, the position of load 13 will be different from input signal and consequently will lag behind the input requirement. If coupler 11 were rigid, as in a conventional servo system, inertial forces would be produced due to the acceleration of load 13 thus exerting physical strain on the mechanical system of the servo system and, in addition, subjects motor 14 to possible undesirable variations in load conditions. Additionally, in this example, as motor 14 is deenergized, the load 13 tends to resist the speed reduction in accordance with the input signal due to its momentum and will tend to force the servo system to overrun the programmed or null position. Consequently, coupling 11 is placed in the system between the gear reduction 16 output shaft and load 13 in order to uncouple the shaft from load 13 when motor 14 is accelerating in response to the error signal. In addition, the coupler 11 functions to damp or absorb inertial energy produced by speed changes forced on load 13 by the servo system response to input signals at input 17.

Coupler 11 is illustrated in FIGURES 1 and 2 of the drawings. A drive shaft 22 of the coupler 11 is connected to the encoder 12 in FIG. 3. The drive shaft 22 could be connected directly to the motor 14, however, it is customary to include a gear reduction 16 as illustrated. The drive shaft 22 is mounted on bearings 23 which are in turn mounted on a frame or casing 24 of coupler 11. At the end of drive shaft 22 there is mounted a disc 26. The disc is rigidly connected to shaft 22 and is carried with shaft 22 each time the shaft is rotated in response to a programming input signal. A pair of hydraulic cylinders 27 and 28 are rigidly mounted on disc 26 by mounts 29 and 31 respectively. The cylinders 27 and 28 are mounted near the outer periphery of disc 26 so that as the disc 26 is rotated by shaft 22 the cylinders 27 and 28 will move through a large arc with the disc. Note that cylinder 27 has a larger cross sectional area and piston bore than cylinder 28. Each of the cylinders 27 and 28 has a roller 32 and 33 mounted on clevises 34 and 35 respectively and all are in turn connected to piston rods 36 and 37. The rollers 32 and 33 are used to yieldably engage arm 38 when the coupler is in operation.

Also mounted on the outer periphery of disc 26 is a guard stop 39 and a reference stop 41. Stops 39 and 41 are mounted on either side of arm 38 in such a position that arm 38 will travel only a limited distance determined by the distance between stops 39 and 41. Arm 38 is rigidly mounted on positioning shaft 42. Positioning shaft 42 is mounted on bearings 43 which are in turn mounted in the frame 24 of coupler 11. Positioning shaft 42 and arm 38 are not connected to disc 26 and drive shaft 22 in any way except through the cylinders 27 and 28 which in turn engage arm 38 only through the piston rods 36 and 37 respectively. A load 13 (see FIGURE 3) is connected to positioning shaft 42.

When an input signal, which constitutes a programming signal, is introduced to digital comparator 18, motor 14 is excited by speed control 21 in response to an error voltage from comparator 18 as a result of a comparison between a digital signal from encoder 12 and the digital programming input signal. When motor 14 begins to accelerate in response to a signal from the speed control 21, drive shaft 22 rotates disc 26 in the counterclockwise direction as viewed in FIGURE 2. When the servo system is at rest, arm 38 engages reference stop 41. As the servo motor 14 begins to accelerate in response to an input programming signal, disc 26 tends to rotate and the inertial forces in the load 13 causes the angular movement of shaft 42 to lag the movement of drive shaft 22. Also when the input signal occurs a rotary hydraulic valve 44 (see FIG. 4) is operated by a rotary solenoid 45. No circuitry is shown which operates rotary solenoid 45, however, solenoid 45 may be energized by conventional circuitry which is properly synchronized with the null signal from comparator 18 over line 61 to energize solenoid 45 when an input signal occurs at input 17.

As soon as an error signal appears at the output of the digital comparator 18, the null signal to coupler 11 disapears and the rotary solenoid 45 rotates valve 44 from the position shown in FIG. 4 through the positions shown in FIGURES 5 and 6 to the position shown in FIGURE 7. When momentarily in the position illustrated in FIG. 6, valve 44 interconnects large drain lines 46 and 47. When lines 46 and 47 are interconnected the fluid pressure in the hydraulic system, which is determined by the hydraulic air pressure trapped in reservoir 48, is rapidly reduced. Fluid drains from reservoir 48 through the large supply lines 46 and 47 back to pump 49 thus rapidly reducing the pressure in the hydraulic system to zero or nearly zero pressure. When the valve assumes the position of FIG. 7, disc 26 is angularly accelerated in response to the servo motor and since the pressure in the hydraulic system and consequently the pressure in cylinders 27 and 28 is reduced to nearly zero, arm 38 is no longer forcibly maintained in contact with reference stop 41. Inertia of the load 13, shaft 42, and arm 38 tend to maintain arm 38 sationary and the driving force of disc 26 is transmitted to arm 38 indirectly by the cylinders 27 and piston rod 36 through the hydraulic fluid of the hydraulic system 51. The acceleration forces exerted on load 13 are developed by the resistance to fluid flow as hydraulic fluid is forced from cylinder 27 to cylinder 28 through the suply line 53. In this state there is no transfer of fluid from the reservoir 48 and associated lines to the pump 49. The pressure in the hydraulic system beyond valve 44 which includes reservoir 48 and cylinders 27 and 28 remain constant near zero.

Thus it can be seen that as motor 14 accelerates in response to a programming signal, the load 13 is effectively disconnected from the drive shaft 22. Guard stop 39 acts as a limit so that the load 13 and shaft 42 will not be permitted to lag behind the motor 14 to an undesirable extent. If the inertial forces of load 13 are too great, disc 26 will rotate counter clockwise relative to arm 38 to the extent that the arm 38 will engage guard stop 39 which in turn will then furnish the means for rapidly accelerating positioning shaft 42 to prevent an undesirably great lag between motor 14 and load 13.

When the error signal decreases as null is approached, motor 14 begins to decelerate. Under this dynamic condition, load 13, due to inertia, tends to rotate shaft 42 faster than the now decreasing shaft 22 and motor 14. The force conditions or coupler 11 are now reversed. Arm 38 tends to rotate in a counterclockwise direction faster than disc 26. However, the hydraulic pressure in cylinder 28 transfers an opposing force through piston rod 37 and roller 33 to resist the deceleration forces generated in load and consequently piston 28 acts as a fluid coupling to decelerate load 13.

Thus it can be seen that cylinders 27 and 28 transmit acceleration and deceleration forces of load 14 through shaft 42 and arm 38 to the hydraulic system 51 by way of cylinders 27 and 28 during the positioning of the shaft 22 and in addition cylinders 27 and 28 provide a yieldable coupling for the inertial or rough positioning of load 13. Line 50 is simply a pressure relief stage for the pump 49.

Notice that in the cases of acceleration and deceleration, energy is dissipated in the hydraulic system as a result of viscous damping of inertial forces. Dissipation of energy in this manner thus enhances the stabilization of the decoupled servo system by absorbing rotational energy at a rate proportional to the angular acceleration or deceleration relative to the driving disc 26.

As the system comes to rest or attains the null position, shaft 42 and arm 38 may come to rest in a position illustrated in FIG. 2. This position is not the final programmed position since the final programmed position is represented by reference stop 41. The occurrence of the null signal on line 61 causes the rotary solenoid 45 to rotate valve 44 to the position illustrated in FIG. 4. Pressure in the system 51 is slowly increased when motor 53 operates pump 49 to pump fluid into reservoir 48. The slow build-up in pressure is uniform throughout the hydraulic system 51. Lines 53 and 54 which are smaller than the drain line 46, limit the fluid flow into the reservoir 48 to insure a slow uniform build-up of pressure. Since the piston of cylinder 27 is of greater cross sectional area than the piston of cylinder 28, the total force exerted on piston rod 36 is greater than the total force exerted on piston rod 37. The piston of cylinder 27 overcomes the opposing force exerted by the piston of cylinder 28 and moves arm 38 into contact with reference stop 41. This final positioning takes place relatively slowly since the build up of pressure in the system as noted is very slow and the fluid transfer as arm 38 rotates is constricted by the small line 53. It is desirable that the build up in pressure is slow so that the final positioning of the load 13 through rotation of arm 38 and shaft 42 does not create large accelerations and undue strain on the gear reduction 16. Note that also in this final step, relative angular accelerations or decelerations between disc 26 and arm 38 are damped.

It may be appreciated that provision is made for the operation of the hydraulic system 51 while the disc 26 rotates. For example, the entire hydraulic system 51 may be mounted on the disc 26 and slip rings used to establish an electrical connection to the rotary solenoid 45 and to the pump motor 53 so that the hydraulic system 51 operates while the disc 26 rotates.

It can be seen that this coupling then eliminates instability in the servo system since; the system inertia is reduced during the stabilization or null seeking period, and it provides for inherent controllable viscous damping during all phases of operation. The use of the reference stop 41 assures no loss in positioning accuracy with this system.

It is to be understood that the above described arrangement is simply illustrative of the application of the principles of the invention. Numerous other arrangements may be readily devised by those skilled in the art which will employ the principles of the invention and fall within the spirit and scope thereof.

What is claimed:
1. Apparatus for positioning a load in accordance with programmed input and null signals, which comprises:
a driven member for positioning said load;
a driving member;
means responsive to said input signal for operating said driving member;
coupling means normally providing a rigid interconnection between said driving member and said driven member; and
control means rendered effective upon occurrence of said input signal for relaxing said rigid interconnection of said coupling means, said control means being rendered effective upon occurrence of said null signal for re-establishing said rigid interconnection to finally position said load.

2. Apparatus for controlling programmed positioning of a load comprising first means for positioning said load; means responsive to an input signal for energizing said first means in accordance with said input signal; and means interconnecting said load and said first means for relaxing the connection between said first means and said load when said first means responds to said energizing means and for finally positioning said load when said energizing means de-energizes said first means, said relaxing and first means including an hydraulic system and opposed hydraulic pistons a first of which overcomes a second to finally position said load.

3. Apparatus for controlling programmed positioning of a load comprising a motor for positioning said load, means responsive to an input signal for energizing said motor in accordance with said input signal, a coupling interconnecting said load and said motor for relaxing the connection between said motor and said load when said motor accelerates, means forming part of said coupling for damping the reactive forces of static inertia of said load and for positioning said load, and means associated with said coupling and cooperating with said damping means for providing a reference stop for final positioning of said load by said damping means.

4. Apparatus of claim 3 in which said means for damping and positioning comprises a hydraulic damping system including a pair of opposed hydraulic pistons.

5. A coupling for interconnecting a motor and drive shaft with an output shaft and load which comprises a pair of opposing hydraulic pistons a first of which has a greater cross sectional area than a second of said pair, a hydraulic system for distributing equal hydraulic pressure to said pair of pistons, means rigidly connected to said drive shaft for securing said pair of pistons for rotation with said drive shaft, means mounted on said output shaft and interposed between said pair of opposing pistons for engaging said pair of pistons when said motor accelerates and decelerates whereby the inertial forces of said load are dampened by said pair of opposed pistons, and a reference stop associated with said securing means for terminating movement of said output shaft and load when said first piston overcomes the opposing force of said second piston and forces said engaging means to engage said stop.

6. A coupling for interconnecting a motor and drive shaft with an output shaft and load which comprises a pair of opposing pistons a first of which has a greater cross sectional area than a second of said pair for providing a yieldable coupling between said shaft, a system for distributing equal fluid pressure to said pair of pistons, means rigidly connected to said drive shaft for securing said pair of pistons for arcuate movement with said drive shaft, means interposed between said pair of pistons for transferring force from said pistons to said output shaft, a reference stop, means for rapidly reducing the pressure in said system when said motor accelerates so that inertial forces of said load are transferred to said transferring means and rapidly dampened by said first piston, and means for increasing the pressure in said system when said motor ceases to rotate said drive shaft to terminate movement of said transferring means when said first piston overcomes said second piston and forces said transferring means to engage said stop.

7. A coupler for yieldably interconnecting a load and a motor which comprises a drive shaft connected to said motor, a disc rigidly mounted on said drive shaft, an output shaft connected to said load, an arm rigidly connected to said output shaft, a pair of opposed hydraulic pistons mounted on said disc with said arm interposed between and yieldably secured by said pistons to rotate said output shaft when said disc is rotated, and a reference stop associated with said disc for stopping said rotating arm when said disc ceases to rotate.

References Cited by the Examiner

UNITED STATES PATENTS

| | | | |
|---|---|---|---|
| 1,054,468 | 2/13 | Steadman | 64—26 |
| 1,180,695 | 4/16 | Carlson. | |
| 1,611,608 | 12/26 | Psilander | 64—14 |
| 1,815,639 | 7/31 | Wilkin et al. | 64—26 |
| 1,999,377 | 4/35 | Stoller. | |
| 2,177,516 | 10/39 | Carlson. | |
| 2,837,902 | 6/58 | Stevens et al. | 64—27 |
| 2,880,705 | 4/59 | Schneider | 91—387 |

ROBERT C. RIORDON, *Primary Examiner.*

KARL J. ALBRECHT, *Examiner.*

UNITED STATES PATENT OFFICE
CERTIFICATE OF CORRECTION

Patent No. 3,212,291            October 19, 1965

Douglas A. Kohl

It is hereby certified that error appears in the above numbered patent requiring correction and that the said Letters Patent should read as corrected below.

Column 4, line 65, for "decreasing shaft" read -- decelerating shaft --.

Signed and sealed this 19th day of September 1967.

(SEAL)
Attest:

ERNEST W. SWIDER            EDWARD J. BRENNER
Attesting Officer            Commissioner of Patents